US008392401B1

(12) United States Patent  
Aly et al.

(10) Patent No.: US 8,392,401 B1
(45) Date of Patent: Mar. 5, 2013

(54) QUERY PARTITIONING TO DECOMPOSE HOTSPOTS IN SENSOR NETWORKS

(75) Inventors: Mohamed Aly, Pittsburgh, PA (US); Adel A. Youssef, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 714 days.

(21) Appl. No.: 11/875,571

(22) Filed: Oct. 19, 2007

Related U.S. Application Data

(60) Provisional application No. 60/947,370, filed on Jun. 29, 2007, provisional application No. 60/956,028, filed on Aug. 15, 2007.

(51) Int. Cl.
*G06F 7/00* (2006.01)
*G06F 17/30* (2006.01)
*G06F 17/00* (2006.01)

(52) U.S. Cl. .......... 707/718; 707/919; 707/921; 707/959
(58) Field of Classification Search .................. 707/769, 707/999.001–999.005, 713, 718
See application file for complete search history.

(56) References Cited

U.S. PATENT DOCUMENTS

| | | | | |
|---|---|---|---|---|
| 6,304,556 | B1 * | 10/2001 | Haas | 370/254 |
| 6,457,047 | B1 * | 9/2002 | Chandra et al. | 709/217 |
| 6,768,994 | B1 * | 7/2004 | Howard et al. | 707/999.01 |
| 6,980,985 | B1 * | 12/2005 | Amer-Yahia et al. | 707/999.004 |
| 7,184,945 | B1 | 2/2007 | Takahashi et al. | |
| 7,389,295 | B2 * | 6/2008 | Jung et al. | 707/999.01 |
| 7,506,011 | B2 * | 3/2009 | Liu et al. | 707/999.204 |
| 7,710,884 | B2 * | 5/2010 | Liu et al. | 370/238 |
| 2001/0021175 | A1 | 9/2001 | Haverinen | |
| 2001/0033556 | A1 * | 10/2001 | Krishnamurthy et al. | 370/329 |
| 2002/0143755 | A1 * | 10/2002 | Wynblatt et al. | 707/3 |
| 2003/0039250 | A1 | 2/2003 | Nichols et al. | |
| 2004/0010492 | A1 * | 1/2004 | Zhao et al. | 707/3 |
| 2005/0078672 | A1 | 4/2005 | Caliskan et al. | |
| 2005/0135360 | A1 | 6/2005 | Shin et al. | |
| 2005/0157698 | A1 | 7/2005 | Park et al. | |
| 2005/0204018 | A1 * | 9/2005 | Jensen | 709/219 |
| 2006/0002368 | A1 | 1/2006 | Budampati et al. | |
| 2006/0046664 | A1 * | 3/2006 | Paradiso et al. | 455/96 |
| 2006/0062154 | A1 * | 3/2006 | Choy et al. | 370/242 |
| 2006/0077918 | A1 | 4/2006 | Mao et al. | |
| 2006/0092913 | A1 | 5/2006 | Joseph et al. | |
| 2006/0153154 | A1 * | 7/2006 | Yoon et al. | 370/338 |
| 2006/0161645 | A1 * | 7/2006 | Moriwaki et al. | 709/223 |
| 2006/0200696 | A1 | 9/2006 | Shimada | |
| 2006/0259597 | A1 | 11/2006 | Jiang et al. | |
| 2006/0280129 | A1 | 12/2006 | Kline et al. | |
| 2007/0019604 | A1 * | 1/2007 | Hur et al. | 370/347 |

(Continued)

OTHER PUBLICATIONS

S. Kim, S. H. Son, J. A. Stankovic, S. Li, and Y. Choi. Safe: A data dissemination protocol for periodic updates in sensor networks. In Workshop on Data Distribution for Real-Time Systems (DDRTS), May 2003.*

(Continued)

*Primary Examiner* — Jacob F Bétit
*Assistant Examiner* — Kannan Shanmugasundaram
(74) *Attorney, Agent, or Firm* — Fish & Richardson P.C.

(57) ABSTRACT

A first query that is substantially similar to a second query is detected. A network of sensors includes a first sensor, a second sensor, and a data-source sensor, the first and second queries are addressed to the data-source sensor, and the first query is forwarded by the first sensor to the data-source sensor and the second query is forwarded by the second sensor to the data-source sensor. The data-source sensor provides, to the first sensor, results answering the first query. The first sensor provides the results to the second sensor.

28 Claims, 10 Drawing Sheets

U.S. PATENT DOCUMENTS

| | | | |
|---|---|---|---|
| 2007/0043803 A1* | 2/2007 | Whitehouse et al. | 709/201 |
| 2007/0214046 A1* | 9/2007 | Falchuk et al. | 705/14 |
| 2008/0056291 A1* | 3/2008 | Liu et al. | 370/431 |
| 2009/0055691 A1* | 2/2009 | Ouksel et al. | 714/48 |

OTHER PUBLICATIONS

Yin L, Cao G (2004) Supporting cooperative caching in ad hoc networks. In: Proceedings of the 23rd conference of the IEEE communications society (Infocom 2004), Hong Kong, Mar. 2004.*

Prabh KS, Abdelzaher TF (2005) Energy-conserving data cache placement in sensor networks. ACM Trans Sensor Netw 1(2):178-203.*

H.L. Xuan and S. Lee, A coordination-based data dissemination protocol for wireless sensor networks, in: Proceedings of the 2004 Intelligent Sensors, Sensor Networks and Information Processing Conference, ISSNIP 2004, Melbourne Australia (Dec. 14-17, 2004), pp. 13-18.*

Fan Ye, Haiyun Luo, Jerry Cheng, Songwu Lu, Lixia Zhang, A two-tier data dissemination model for large-scale wireless sensor networks, Proceedings of the 8th annual international conference on Mobile computing and networking, Sep. 23-28, 2002, Atlanta, Georgia, USA.*

Aly, M. et al. "Decomposing Data-Centric Storage Query Hot-Spots in Sensor Networks," Proceedings of MOBIQUITOUS, 2006, 9 pages.

Aly, M. et al. "KDDCS: A Load-Balanced In-Network Data-Centric Storage Scheme for Sensor Networks," Proceedings of CIKM, Nov. 5-11, 2006, Arlington, Virginia, 10 pages.

Aly, M. et al. "Online Packet Admission and Oblivious Routing in Sensor Networks," Proceedings of ISAAC, 2006, 10 pages.

Aly, M. et al. "Zone Sharing: A Hot-Spots Decomposition Scheme for Data-Centric Storage in Sensor Networks," Proceedings of DMSN, Aug. 29, 2005, Trondheim, Norway, 6 pages.

Baek, S. J. et al. "A Scalable Model for Energy Load Balancing in Large-scale Sensor Networks," Proceedings of the International Symposium on Modeling and Optimization in Mobile, Ad Hoc and Wireless Networks, Jun. 2006, 10 pages.

Busch C. et al. "Oblivious Routing on Geometric Networks," Jul. 18-20, 2005, Proceedings of SPAA, Las Vegas, Nevada, 9 pages.

Dulman, S. et al. "Trade-Off between Traffic Overhead and Reliability in Multipath Routing for Wireless Sensor Networks," Proceedings of IEEE Wireless Communications and Networking Conference (WCNc), Jan. 2003, 5 pages.

Fonseca, R. et al. "Beacon Vector Routing: Scalable Point-to-Point Routing in Wireless Sensornets," NSDI '05: 2nd Symposium on Networked Systems Design & Implementation, 2005, pp. 329-341, 14 pages.

Ganesan, D. et al. "Highly-Resilient, Energy-Efficient Multipath Routing in Wireless Sensor Networks," ACM SIGMOBILE Mobile Computing and Communications Review, Long Beach, California, pp. 251-254, 4 pages.

Hajiaghayi, M. et al. "New Lower Bounds for Oblivious Routing in Undirected Graphs," Proceedings of SODA, Miami, Florida, Jan. 22-26, 2006, pp. 918-927, 10 pages.

Hajiaghayi, M. et al. "Oblivious Routing in Directed Graphs with Random Demands," Proceedings of STOC, Baltimore, Maryland, May 2005, pp. 193-201, 9 pages.

Harrelson C. et al. "A Polynomial-time Tree Decomposition to Minimize Congestion," Proceedings of SPAA, San Diego, California, Jun. 7-9, 2003, pp. 34-43, 10 pages.

Intanagonwiwat C. et al. "Directed Diffusion for Wireless Sensor Networking," IEEE/ACM Transactions on Networking (TON), 2003, pp. 2-16, 15 pages.

Karp B. et al. "GPSR: Greedy Perimeter Stateless Routing for Wireless Networks," Proceedings of ACM Mobicom, 2000, Boston, Massachusetts, pp. 243-254,12 pages.

Kim, Y.J. et al. "On the Pitfalls of Geographic Face Routing," Proceedings of DIALM-POMC, Sep. 2, 2005, Cologne, Germany, pp. 34-43, 10 pages.

Newsome, J. et al. "GEM: Graph Embedding for Routing and Data-Centric Storage in Sensor Networks Without Geographic Information," Proceedings of SenSys, Nov. 5-7, 2003, Los Angeles, California, pp. 76-88, 13 pages.

Racke, H. et al. "Minimizing Congestion in General Networks," Proceedings of the 43rd Annual Symposium on Foundations of Computer Science (FOCS'02), 2002, 10 pages.

Raicu, I. et al. "Local Load Balancing for Globally Efficient Routing in Wireless Sensor Networks," International Journal of Distributed Sensor Networks, 2005, 35 pages.

Rao, A. et al. "Geographic Routing without Location Information," Proceedings of Mobicom, 2003, San Diego, California, pp. 96-108, 13 pages.

Shah, R. et al. "Energy Aware Routing for Low Energy Ad Hoc Sensor Networks," Proceedings of IEEE Wireless Communications and Networking Conference (WCNc), 2002, 6 pages.

Al-Karaki, et al, "Routing Techniques in Wireless Sensor Networks: A Survey," IEEE Wireless Communications, Dec. 2004, pp. 6-28.

* cited by examiner

QUERY PARTITIONING TO DECOMPOSE HOTSPOTS IN SENSOR NETWORKS

CROSS-REFERENCE TO RELATED APPLICATIONS

This application claims the benefit of U.S. Provisional Application No. 60/947,370, filed Jun. 29, 2007, and titled A TRAFFIC-OBLIVIOUS LOAD-BALANCING PROTOCOL FOR SENSOR NETWORKS, and U.S. Provisional Application No. 60/956,028, filed Aug. 15, 2007, and titled QUERY PARTITIONING TO DECOMPOSE HOTSPOTS IN SENSOR NETWORKS, which are both incorporated by reference in their entirety.

TECHNICAL FIELD

This description relates to load balancing in a network.

BACKGROUND

Sensors are able to communicate through networks to computers. A networked sensor generally is able to transmit status information and operating data over the network, as well as receive and respond to messages, such as commands or queries, received over the network.

SUMMARY

In one general aspect, a first query that is substantially similar to a second query is detected. A network of sensors includes a first sensor, a second sensor, and a data-source sensor, the first and second queries are addressed to the data-source sensor, and the first query is forwarded by the first sensor to the data-source sensor and the second query is forwarded by the second sensor to the data-source sensor. The data-source sensor provides, to the first sensor, results answering the first query. The first sensor provides the results to the second sensor.

The data-source sensor may store recent queries received from sensors in the sensor network, responses provided to the recent queries, and identifiers of the sensors to which the queries were provided. The first query may be substantially similar to the second query in the event that the first query and the second query request the same data from the data-source sensor. At least one of the first query and the second query may request data of a particular type stored on one or more sensors included in the sensor network. At least one of the first query and the second requests data related to a particular geographic area. The data related to a particular geographic area comprises at least one indication of an available capacity of the geographic area. The first query and the second query may include more than one portion, and the first query may be substantially similar to the second query when the first query and the second query have at least one matching portion.

That a predetermined number of queries were received in a predetermined time may be determined by the data source. An indicator may be sent to the first sensor to provide the results to the second sensor. The results may be provided to the second sensor based on the indicator. The network of sensors may include devices configured to query the sensors included in the sensor network, and the devices may include at least one mobile device. The first query may be forwarded using an underlying routing protocol of the sensor network, and the results answering the query may be provided to the first and second sensor using the underlying routing protocol of the sensor network. The underlying routing protocol may be a point-to-point protocol. The first query and the second query may be detected within a predetermined amount of time. The first query and the second query may be detected simultaneously.

In another general aspect, a data-source sensor is configured to detect a first query that is substantially similar to a second query. The network of sensors includes a first sensor, a second sensor, and a data-source sensor. The first and second queries are addressed to the data-source sensor, and the first query are forwarded by the first sensor to the data-source sensor and the second query is forwarded by the second sensor to the data-source sensor. Results answering the query are provided, based on a determination that the first sensor and the second sensor are located in generally opposite directions relative to the data-source sensor, to an intermediate sensor that generally lies between a location of the first sensor and a location of the second sensor. The intermediate sensor is configured to provide the results both to the first sensor and the second sensor.

The data-source sensor may store queries received from sensors in the sensor network, responses provided to the queries, and identifiers of the sensors to which the queries were provided. The data-source sensor also may determine a location of each of the first sensor, the second sensor, and the data-source sensor. Whether the locations of the first sensor, the second sensor, and the data-source sensor form approximately an equilateral triangle may be determined. If the locations form approximately an equilateral triangle, the results answering the query may be sent to an intermediate sensor having a location between the first sensor and the second sensor. The results answering the query may be forwarded from the intermediate sensor to the first and second sensors. The first sensor and the second sensor may be located in opposite directions relative to the data-source sensor if a distance from the data-source sensor to the first sensor is less than a distance from the data-source sensor to the second sensor. Distance may be based on a number of sensors a packet passes through when forwarded from the data-source sensor to the first or second sensor. Distance may be based on a geographic distance. The intermediate sensor may generally lie between a location of the first sensor and a location of the second sensor in the event that the first sensor, the intermediate sensor, and the second sensor fall on a straight line, and a distance from the intermediate sensor to either of the first or second sensors is not more than a distance from the first sensor to the second sensor.

In another general aspect, a first query that is substantially similar to a second query is detected. The network of sensors includes a first sensor, a second sensor, and a data-source sensor. The first query and the second query are addressed to the data-source sensor, the first query is forwarded by the first sensor to the data-source sensor and the second query is forwarded by the second sensor to the data-source sensor, and the second query is detected before determining results answering the first query. The data-source sensor provides, to the first sensor, the results answering the first query based on a determination that the first sensor and the second sensor are located in the same direction relative to the data-source sensor. The first sensor provides the results to the second sensor.

The data-source sensor may provide, to the first sensor, results answering the first query and a request to provide the results to the second sensor. The first sensor and the second sensor may be located in same direction relative to the data-source sensor in the event that a distance from one of the first and second sensors to the data-source sensor is less than a distance from the other of the first and second sensors to the data-source sensor. The first query may be substantially similar to the second query when the first query and the second query request the same data from the data-source sensor. At least one of the first query and the second query may request data related to a particular geographic area. The first query and the second query may include more than one portion, and the first query may be substantially similar to the second query when the first query and the second query have at least one identical portion. The network of sensors also may include multiple devices configured to query the sensors included in the sensor network, and the multiple devices may include at least one mobile device.

The first query may be forwarded using an underlying routing protocol of the sensor network, and the results answering the query may be provided to the first and second sensor using the underlying routing protocol of the sensor network. The underlying routing protocol may be a point-to-point protocol.

Implementations of the described techniques may include a method or process or computer software on a computer-readable medium.

The details of one or more implementations are set forth in the accompanying drawings and the description below. Other features will be apparent from the description and drawings, and from the claims.

DETAILED DESCRIPTION

Figure 1A:
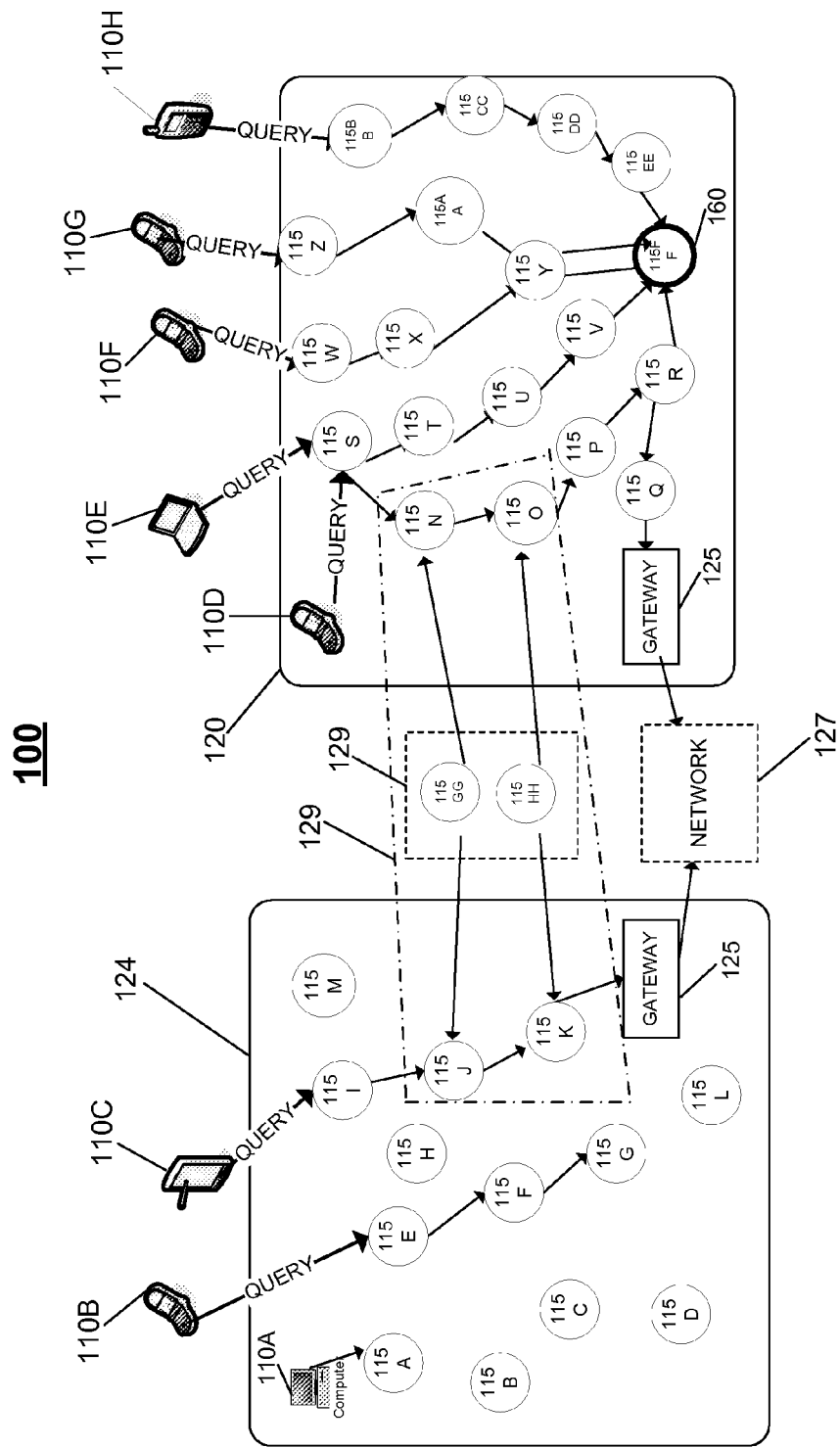
FIG. 1A is a block diagram depicting an example communications system.

FIG. 1A is a block diagram depicting an example communications system. More particularly, FIG. 1A illustrates an example communications system 100 in which sensor query devices 110A-110G query sensors 115A-115FF for information stored on the sensors 115A-115FF. In general, the sensors 115A-115HH are clustered into geographically localized sensor networks, illustrated as sensor networks 120, 124, 128 and 129. The sensor networks 120, 124, 128 and 129 also may be referred to as clusters or sensor clusters.

In general, a query is issued from a sensor query device to a sensor within the sensor network. The sensor that detects the query issued from the sensor query device may be referred to as the "query issuer." The query issuer forwards the query toward the sensor, or sensors, to which the query is addressed. The sensor to which the query is addressed may be referred to as the "data-source sensor." The data-source sensor, or sensors, responds to the query and forwards results answering the query to the query issuer. The query issuer forwards the results to the sensor query device from which the query originated. For example, as shown in FIG. 1A, the sensor query device 110F issues a query for data that is stored on sensor 115F. The sensor 115W receives the query and forwards the query toward the sensor 115F. Thus, in this example, the sensor 115W is the query issuer and the sensor 115F is the data-source sensor. However, any sensor in the sensor networks 120, 124, 128, and 129 may act as a query issuer or as a data-source sensor. Additionally or alternatively, the sensor query devices may be considered query issuers.

A sensor query device may be a mobile device such as, for example, a cellular telephone, a personal data assistant (PDA), a robot, and/or a laptop. As illustrated, the sensor query devices 110B-110H are mobile devices. A sensor query device also may include stationary devices such as, for example, servers, workstations, and desktop computers. As illustrated, sensor query device 110A is a stationary device. Because the sensor query devices 110B-110H are mobile devices that move in and out of the networks 120 and 124, and move around within the networks 120 and 124, the amount and distribution of traffic (which arises from queries made by the sensor query devices 110A-110H) in the sensor networks 120 and 124 may be unpredictable because the number and location of sensor query devices 110A-110H is variable. Moreover, queries may be made by sensor query devices that are within the boundaries of the networks 120 and 124, such as the sensor query device 110D, or by sensor query devices located outside of the boundaries of the sensor networks 120 and 124, such as the sensor query devices 110E-110H. The sensor query devices 110B-110H may move around within the networks 120 and 124 and the sensor query devices 110B-110H may move between the networks 120 and 124. For example, as shown, the sensor query device 110D is located within the network 120. However, the sensor query device 110D may move around within the network 120, outside of the network 120, or inside of the network 124.

Additionally, the amount and distribution of traffic across the networks 120 and 124 may vary temporally because certain types of queries are more popular during a particular time of day (e.g., queries for available parking spots near a popular restaurant during dinner time) or during a particular event (e.g., queries for available parking spots in a parking lot near a stadium shortly before a professional sports game). Thus, the traffic across the sensor networks 120 and 124 may be unevenly distributed, which may lead to reduced lifetime and reduced operability of the sensors that process a higher volume of packets.

In particular, a query hotspot may occur when most of the queries made within the sensor network request data stored on one or a small number of the sensors 115A-115FF. For example, a query hotspot 160 is illustrated in the sensor network 120. In this example, the sensor query devices 110D-110G issue queries addressed to the sensor 115FF. The sensor 115FF detects the queries simultaneously, or nearly simultaneously, which results in a query hotspot 160. The query hotspot 160 may occur because of the popularity of a particular sensor at a certain time of day, a certain day of the week, because of the location of the sensor, or because of the type of data that the sensor provides. For example, the query hotspot 160 may be caused by many queries requesting temperature readings stored on a relatively small number of sensors 115. In another example, the query hotspot 160 may be a result of many queries simultaneously requesting geographic location-specific information from a sensor located in an area of interest to many users of mobile devices, such as a sensor with data related to available parking spots during the lunch hour on a weekday.

The presence of the query hotspot 160 increases the possibility of a skewed distribution of traffic across the sensor network 120 because many queries are concentrated in a relatively localized area of the sensor network 120. As a result of the query hotspot 160, network traffic is concentrated in the relatively localized area of the sensor network 120, which may cause the sensors in and around the hot spot 160 to be depleted more quickly as compared to other sensors in the sensor network 124.

As described in more detail below, a content-based scheme to detect and decompose query hotspots may result in the traffic across the sensor network being more evenly distributed despite the presence of a query hotspot. Query hotspots, such as the hotspot 160, may be detected by the data-source sensor (e.g., the sensor to which the queries are addressed). In particular, the data-source sensor tracks the queries that the data-source sensor receives and answers. The data-source sensor detects a possible query hotspot when similar queries address the data-source sensor within a relatively small period of time. Through a technique that may be referred to as "query partitioning," the queries made to the query hotspot 160 may be decomposed by redirecting the query requests addressed to a data-source sensor in the query hotspot 160 to a query issuer sensor that has a stored version of the data that answers the queries. In this manner, the query issue sensor receives the redirected query request and forwards data answering the query to the requesting sensor query device. As a result, the query hotspot may be dissipated because sensors besides the data-source sensor share the burden of providing the data that answers the queries.

In some implementations, the data-source sensor may receive queries for the same data from multiple query issuers simultaneously, or nearly simultaneously. In this implementation, the data-source sensor may determine whether the two query issue sensors are located in the same direction from the data-source sensor or if the two query issues are located in opposite directions from the data-source sensor. If the query issue sensors are on the same side of the data-source sensor, the data-source sensor may forward results answering the query to the closer query issue sensor, which in turn forwards the results to the other query issue sensor, or sensors. Such a technique may be referred to as "two-phase query processing." If the query issue sensors are located in opposite directions with respect to the data-source sensor, the data-source sensor may forward the results answering the queries to an intermediate sensor, which in turn forwards the results to the query issue sensor, or query issue sensors. Such a technique may be referred to as "three-phase query processing."

Figure 1B:
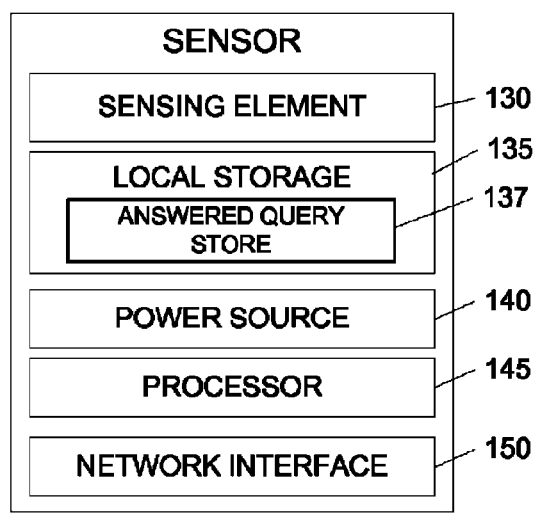
FIG. 1B is a diagram illustrating an example sensor.

FIG. 1B is a block diagram illustrating an example sensor. More particularly, FIG. 1B illustrates the sensor 115, which generally includes a sensing element 130, local storage 135, an answered query store 137, a power source 140, a processor 145, and a network interface 150. Sensor 115 may be an implementation of one or more of the sensors 115A-115HH shown in the sensor network 100 of FIG. 1A. Other sensors in the sensor network 100 may include similar components to the components shown in sensor 115. The sensing element 130 collects data that is stored in the local storage 135 such that the sensor 115 may provide the data in response to a query. The sensing element 130 may include more than one type of sensing device. For example, the sensing element 130 may be a sensor such as a temperature sensor, a pressure sensor, a motion sensor, a moisture sensor, an infrared sensor, and/or a device capable of collecting image or video data (e.g., a camera). Thus, the sensing element 130 may monitor data related to the physical environment in the vicinity of the sensor 115. In addition to, or instead of, storing data collected by the sensing element 130, the local storage 135 may store data received from another sensor in the sensor network or a sensor query device 110.

The local storage 135 may be a semiconductor memory device, such as an Erasable Programmable Read-Only Memory (EPROM), an Electrically Erasable Programmable Read-Only Memory (EEPROM), a flash memory device, or another type of component that stores data collected by the sensing element 130. In some implementations, the local storage 135 is configured to overwrite stored data with recently received data. Thus, the sensor 115 may provide real-time, or near real-time, information in response to queries while also allowing the local storage 130 to be of relatively small capacity. In one example, the local storage 135 may have a capacity of about one megabyte or less.

The local storage 135 also includes an answered query store 137. The answered query store 137 may include a history of the queries that the sensor 115 has answered or participated in answering. The answered query store 137 also includes the results of the queries that the sensor 115 has issued. This allows the sensor 115 (which may be any sensor in the sensor network) to act as a data-source sensor for a query that the sensor 115 recently issued. Additionally, the answered query store 137 includes an identifier indicating the sensor from which the query was forwarded and the sensor to which the data answering the query was forwarded.

In general, the answered query store 137 uses relatively little memory. The answered query store may require relatively little memory because the data stored in the answered query store 137 tends to become outdated quickly. For example, if the answered query store 137 stores information related to available parking spaces, the information is accurate until the parking spaces are taken, which may be within minutes. In some implementations, or in some sensors, the answered query store 137 may store two queries and two responses. Alternatively, the answered query store 137 may store four queries and four responses, or ten queries and ten responses. In some implementations, the answered query store 137 may be reset, or cleared of the stored queries and responses after a predetermined amount of time. For example, the answered query store 137 in a sensor that monitors available parking spaces in a downtown area may be cleared every ten minutes. This may help to ensure that the information related to the parking space availability remains accurate and up-to-date. Alternatively, or additionally, the stored queries and answers may be cleared when the memory of the answered query store becomes full.

The local storage 135 also may store data related to the status of the sensor 115. For example, the local storage 135 may store data associated with the activity of the sensor 115, such as, for example, power remaining in the power source 140, the number of queries received by the sensor 115, the number of queries and packets forwarded by the sensor 115, the number of responses provided by the sensor 115. Additionally, the local storage 135 may store instructions for processing and responding to queries received by the sensor 115. In some implementations, the sensor 115 also may include a status indicator component that is separate from the local storage 135. The status indicator may store, for example, power remaining in the power source 140 in lieu of such information being stored in the local storage 135.

The power source 140 may be a portable power source that is included within the sensor 115, such as a battery. In other implementations, the power source 140 may be external to the sensor 115. The sensor 115 also includes a network interface 150 through which the sensor 115 communicates with the other sensors in the sensor network, the sensor query devices 110, and a gateway 125. The network interface 150 may be a wireline or wireless interface configured to provide a data connection between the sensor 115 and the other sensors in the sensor network, the sensor query devices 110, and the gateway 125. For example, the network interface 150 may be, for example, an Ethernet port, a Wi-Fi interface (e.g., an IEEE 802.11 interface), a Bluetooth interface (e.g., an IEEE 802.15.1) interface, or a generic radio transceiver.

Referring back to FIG. 1A, one or more of the sensors 115A-115HH of FIG. 1A may be an implementation of sensor 115 of FIG. 1B. Additionally or alternatively, one or more of the sensors 115A-115HH may include more than one sensor, or a sensor may include more than one type of sensing elements. For example, a sensor may include multiple video cameras and multiple motion detectors.

The sensors included in the sensor networks 120 and 124 may communicate with a network 127 that is separate from the sensor networks 120 and 124 through the gateway 125. The network 127 may be, for example, the Internet. In some implementations, the gateway 125 may be a sensor similar to the sensors 115A-115FF. Thus, the sensors 115A-115M included in the network 124 may communicate with the sensors 115N-115FF included in the network 120 through a sensor similar to the sensor 115 of FIG. 1B. In some implementations, the sensors in the network 120 may communicate with the sensors in the network 124 through an intermediate network 128. As shown, the intermediate network 128 includes sensors 115GG and 115HH. However, the intermediate network 128 may include more or fewer sensors. As shown, the sensors 115J and 115K communicate with the sensors 115N and 115O through the sensors 115GG and 115HH, respectively. Additionally, the sensors 115J, 115K, 115N, 115O, 115GG, and 115HH may be considered an additional network 129.

The sensors 115A-115HH generally know their location and the boundaries of the network. The sensors 115A-115HH may be addressed relative to each other or the sensors 115A-115HH may be addressed by absolute coordinates, such as the latitude and longitude location of each of the sensors 115A-115HH. Thus, the sensors 115A-115HH are able to route packets to other sensors within the network using either the relative or absolute coordinates of the other sensors.

Figure 2:
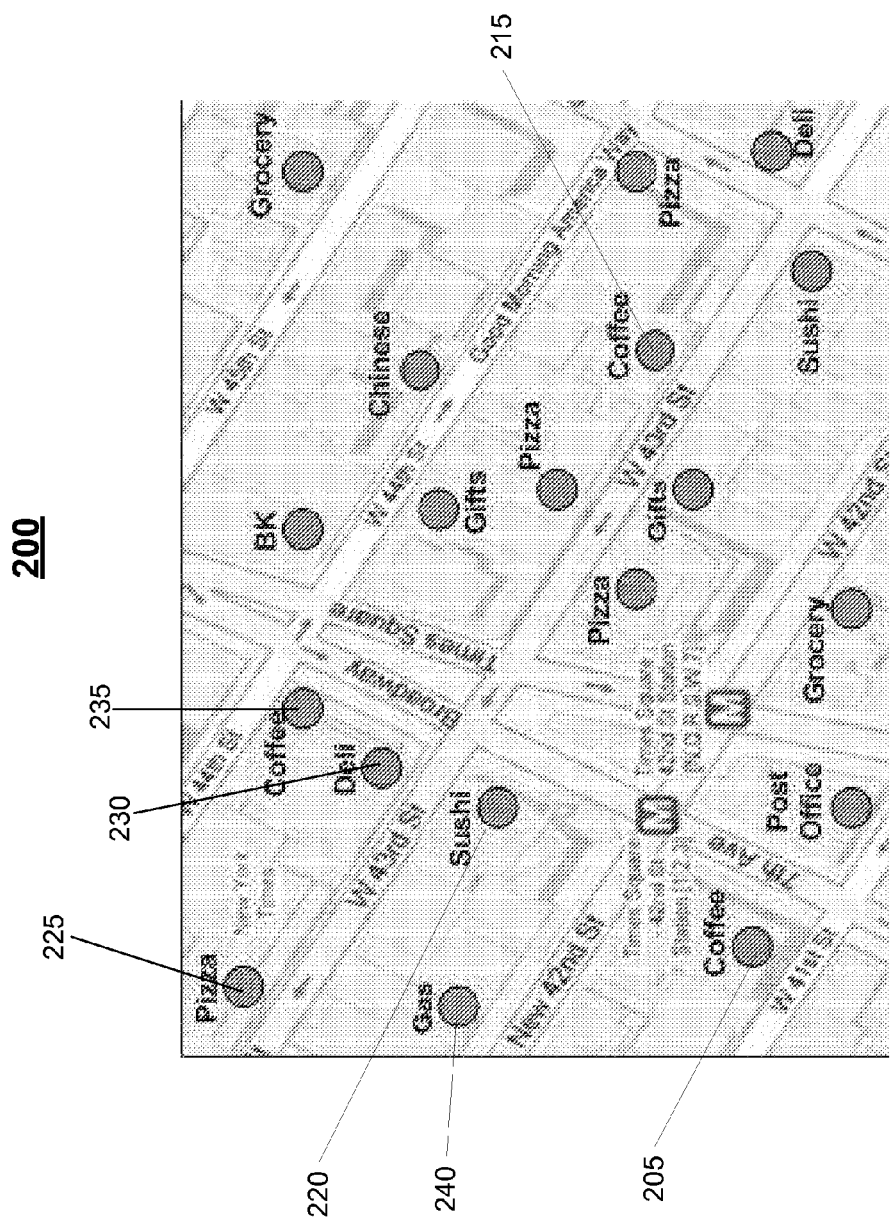
FIG. 2 is an example of a sensor network.

Referring to FIG. 2, an example sensor network 200 includes multiple sensors distributed in a metropolitan area. As shown, the sensor network 200 is distributed over a geographical region including several city blocks. However, in other implementations, the sensor network may be distributed over a larger or smaller geographical area, or distributed within a different type of geographical area (such as, for example, a sensor network in a wilderness area designed to collect and distribute data related to wildlife).

The sensors in the example network 200 measure data and provide information of interest to mobile device users in the area of the sensors or to Internet users that have access to the network 200. For example, a person traveling in an automobile on 7$^{th}$ Avenue between W. 42$^{nd}$ Street and W. 43$^{rd}$ Street may use a mobile device to query the sensor network 200 to find a coffee shop in the vicinity that has available tables. Sensors 205, 210, and 215 are located in or near coffee shops. In this example, the sensor 220, which is located in or near a sushi restaurant, is the closest sensor to the mobile device, thus the sensor 220 receives the query from the mobile device. The sensor 220 selects a random location, or a random sensor, in the sensor network 200 to which to route a packet corresponding to the query. The packet is routed toward the randomly selected location or sensor and to the sensors 205, 210, and 215 after the packet has been routed toward the randomly selected sensor.

Other types of sensors are included in the sensor network 200. A sensor 225 is located in or near a pizza restaurant. In response to a query from a sensor query device, the sensor 225 may provide, for example, an estimated wait time for a table in the restaurant. In this example, the sensor 225 may include one or more of a motion sensor, an infrared sensor, and an imaging sensor. The sensor 225 may estimate the wait time for a table in the pizza restaurant by sensing and characterizing the line of customers waiting for a table, or may estimate the wait time for a table by sensing and characterizing how crowded a waiting area in and around the restaurant is. For example, the sensor 225 may collect video data from the imaging sensor that may be analyzed to determine the length of the line and how quickly the line is moving. The wait time for a table may be approximated from this data.

Sensors 230 and 235 are located in or near a deli and a coffee shop, respectively. The sensors may provide information similar to that provided by sensor 225 but specific to the deli and the coffee shop. For example, the sensor 235 may indicate the types of coffee that are available at from the coffee shop and whether there are any available tables within the coffee shop. The sensor network 200 also includes a sensor 240, which is located at a gas station. The sensor 240 may be configured to provide gasoline prices in response to queries from mobile devices roaming in the area of the sensor network 200.

Figure 3:
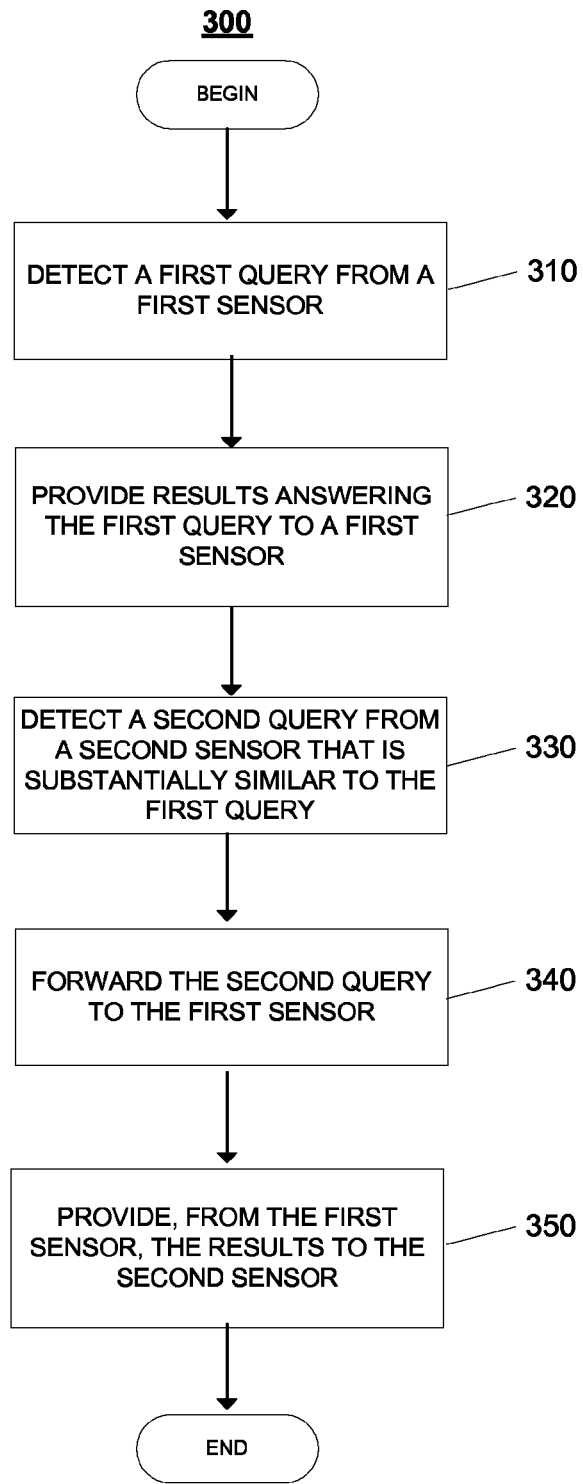
FIG. 3 is a flow diagram of an example process used to process a query detected by a sensor included in a sensor network.

FIG. 3 is a flow diagram of an example process used to process a query detected by a sensor included in a sensor network. More particularly, an example process 300 processes queries addressed to a data-source sensor. The example process 300 may be performed by a data-source sensor such as the sensor 115F described above with respect to FIG. 1A. The process 300 may result in a reduced response burden on a sensor that is addressed by multiple queries for the same information over a relatively short time. Such a sensor may be part of a query hotspot, such as the query hotspot 160 discussed with respect to FIG. 1A. Reducing the response burden on the sensor may result in the sensor having a longer life. Additionally, the process 300 may balance the traffic across the sensor network by redistributing locally concentrated queries that result in a query hotspot to other sensors. Such a process for query processing may be referred to as "query partitioning."

The process 300 begins when a first query from a first sensor is detected (310). The first query may be a query that was initially issued by a sensor query device such as the sensor query device 110F described above with respect to FIG. 1. The first query may be forwarded to the source sensor by a first sensor, and the first query may be stored on the data-source sensor. The first query maybe stored on the sensor in, for example, the answered query store 137. Storing the first query on the data-source sensor allows the data-source sensor to compare the first query to additional queries received after the first query.

Results answering the first query are provided to the first sensor (320). The first sensor stores the results answering the first query. Storing the results answering the first query allows the first sensor to act as a data-source sensor for other queries requesting the same data as the first query. A second query that is substantially similar to the first query is detected (330).

The second query and the first query may be substantially similar if, for example, the first and second queries request the same data. Queries that request the same data may be referred to as "intersecting queries." In other examples, the first and second queries may be substantially similar if at least some portion of the first and second queries request the same data. In this example, the portions of the first and second queries that request the same data "intersect." The first and second queries may be received within a relatively short amount of time. For example, the first and second queries may be received within a few seconds of each other or within a minute of each other. Substantially similar queries received by a data-source sensor within a relatively short amount of time may indicate that the data-source sensor is part of a query hotspot.

The second query is forwarded, or redirected, to the first sensor (340). The first sensor is the sensor to which the results answering the first query were provided, and the results answering the first query are stored on the first sensor. Thus, because the first sensor stored the results answering the first query, and the first and second queries request the same data, the first sensor may respond to the second query. In this manner, the first sensor acts as a data-source sensor for the second query even though the second query was not addressed to the first sensor. In some implementations, the second query may be forwarded to the first sensor by sending a packet from the data-source sensor to the first sensor. The first sensor provides the results answering the first query to the second sensor (350).

Figure 4A:
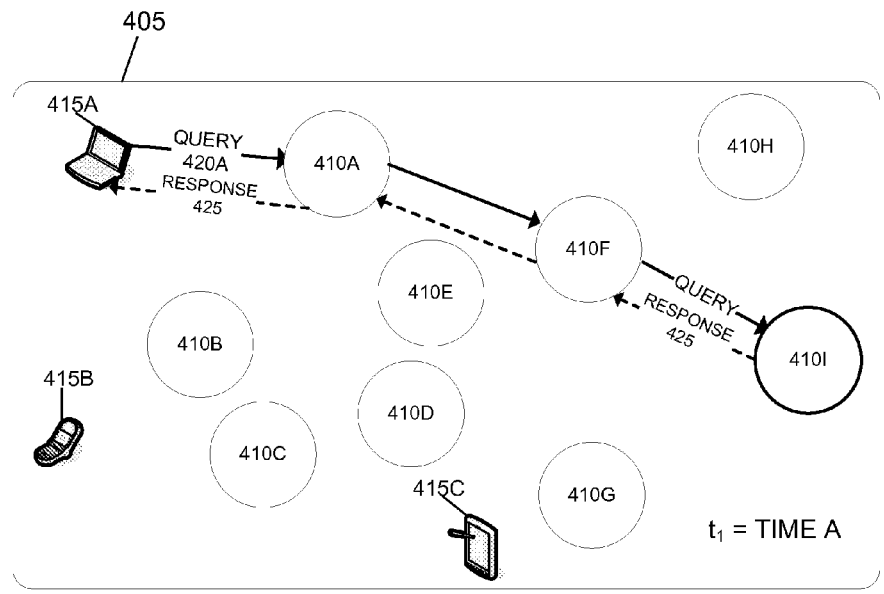
FIG. 4A is a block diagram of an example sensor network.
Figure 4B:
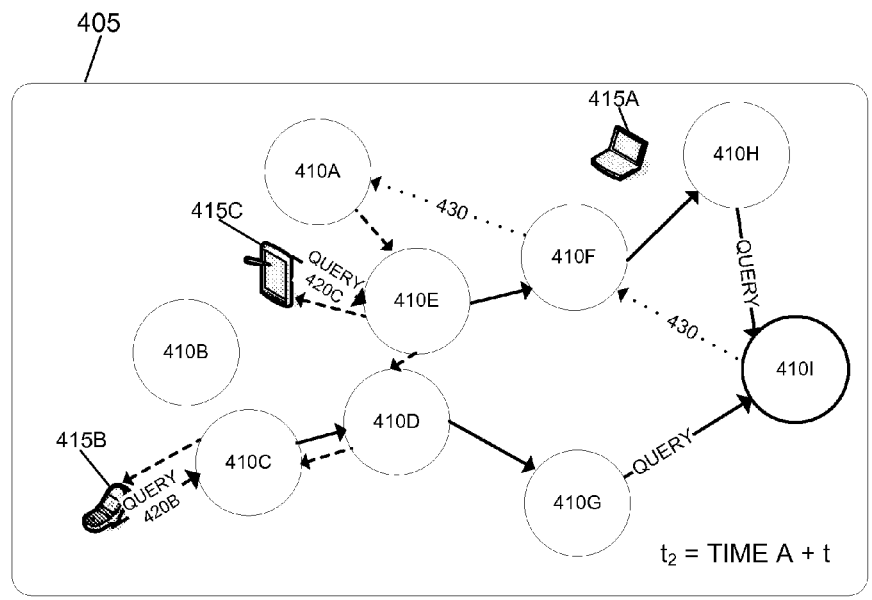
FIG. 4B is a block diagram of an example sensor network.

FIGS. 4A and 4B are block diagrams of example sensor networks. More particularly, an example sensor network 405 illustrates the processing of queries made to sensors 410A-410I by sensor query devices 415A-415C as the users of the sensor query devices 415A-415C roam in the area of the network 405 in search of a parking space in a location near the sensor 410I. In particular, FIG. 4A shows a snapshot of the sensor network 405 at a time "$t_1$," and FIG. 4B shows a snapshot of the sensor network 405 at a later time "$t_2$."

The sensor network 405 includes sensors 410A-410I. Sensor query devices 415A-415C, which are mobile devices in this example, query and receive data from the sensors 410A-410I. As shown in FIG. 4A, the sensor query device 415A issues a query 420A, which is addressed to the sensor 410I. For example, the query 420A may request information about available parking spaces in a parking lot located near the sensor 410I. The sensor 410A, which is near the sensor query device 415A, detects the query and forwards the query through the sensor network 405 to the sensor 410I. In this example, the query is forwarded to the sensor 410F and then to the sensor 410I. The sensor 410I responds and forwards results 425 answering the query through the sensor network to the sensor 410A. The sensor 410I maintains information related to the sensors from which the sensor 410I has received queries. Thus, the sensor 410I stores an indication that the sensor 410A forwarded a query to the sensor 410I. Additionally, the sensor 410A stores the results 425 answering the query. The results answering the query are then forwarded through the sensor network 405 to the sensor query device 415A.

Referring to FIG. 4B, the sensor query devices 410B and 410C issue queries 420B and 420C for information related to parking spaces near the sensor 410I. As shown, time "t" has elapsed from when the sensor query device 415A issued a substantially similar query to the sensor 410I. The time "t" may be a relatively small amount of time, such as 2-3 minutes. The sensor query device 415A has moved from its initial position to a location closer to the sensor 410I as the user of the sensor query device 415A travels to obtain the parking space identified in the results answering the query 410A. The sensor query devices 415B and 415C have moved from their initial positions shown in FIG. 4A as the users of the sensor query devices 415B and 415C continue to search for parking spaces in the vicinity of the sensor 410I.

The sensor query device 415B issues a query 420B requesting information about an available parking spot in a parking lot that is in the vicinity of the sensor 410I. The query 420B is detected by the sensor 410C and forwarded through the network 405 toward the sensor 410I. In this example, the query 420B passes through the sensor 410D and then the sensor 410G forwards the query 420B to the sensor 410I. At the same time, or almost the same time, as when the sensor query device 410B issued the query 420B, the sensor query device 415C issues the query 420C, which is detected by a sensor 410E and forwarded through the network 405 to the sensor 410I. In this example, the query 420C passes through sensors 410F and 410H, which forwards the query 410C to the sensor 410I. In other examples, the queries 420A-420C may travel through a different path to reach the sensor 410I.

When the sensor 410I receives the queries 420B and 420C, the sensor 410I detects that the queries 420B and 420C "intersect," or request the same data (e.g., both queries request information related to availability of parking spaces near the sensor 410I). The sensor 410I determines that the results 425 were sent to the sensor 410A in response to the query 420A. Thus, the sensor 410I redirects the queries 420B and 420C to the sensor 420A using the redirected query 430. In some implementations, the redirected query 430 may be a single packet sent from the sensor 410I to the sensor 410F. In the example shown, the redirected query 430 passes through the sensor 410F as the redirected query 430 travels to the sensor 410A. The sensor 410A accesses the results 425 and forwards the results 425 through the sensor network 405 to the sensors 410C and 410E. As discussed above, the sensors 410C and 410E are the respective query issuer sensors for the queries 415B and 415C. Thus, the sensor 410A redirects the queries 420B and 420C (which may entail sending a single packet), but the sensor 410A actually responds to the queries 420B and 420C (which generally includes sending multiple packets). Accordingly, the process 300 may help to reduce the load on the sensor 410I.

As discussed above, a query may include multiple portions, only some of which intersect. In this example, the sensor 410I determines the portions of the queries 420B and 420C that intersect, and the sensor 410I determines what sensors have answered the portions of the queries 420B and 420C. The sensor 410I forwards the portions of the queries to the sensors to which the sensor 410I has provided data answering the respective portions. In some examples, the sensor 410I may have provided data answering a particular portion of a query to multiple other sensors in the sensor network. In this example, the sensor 410I may determine which of the multiple other sensors to redirect the portion to based on minimizing the total load imposed on each of the sensors. The total load imposed may be measured, for example, by determining the energy expenditure of the sensor. If each sensor would incur the same load as a result of the portion being redirected to it, the sensor 410I selects the sensor closest to the sensor that most recently answered that portion of the query.

Figure 5:
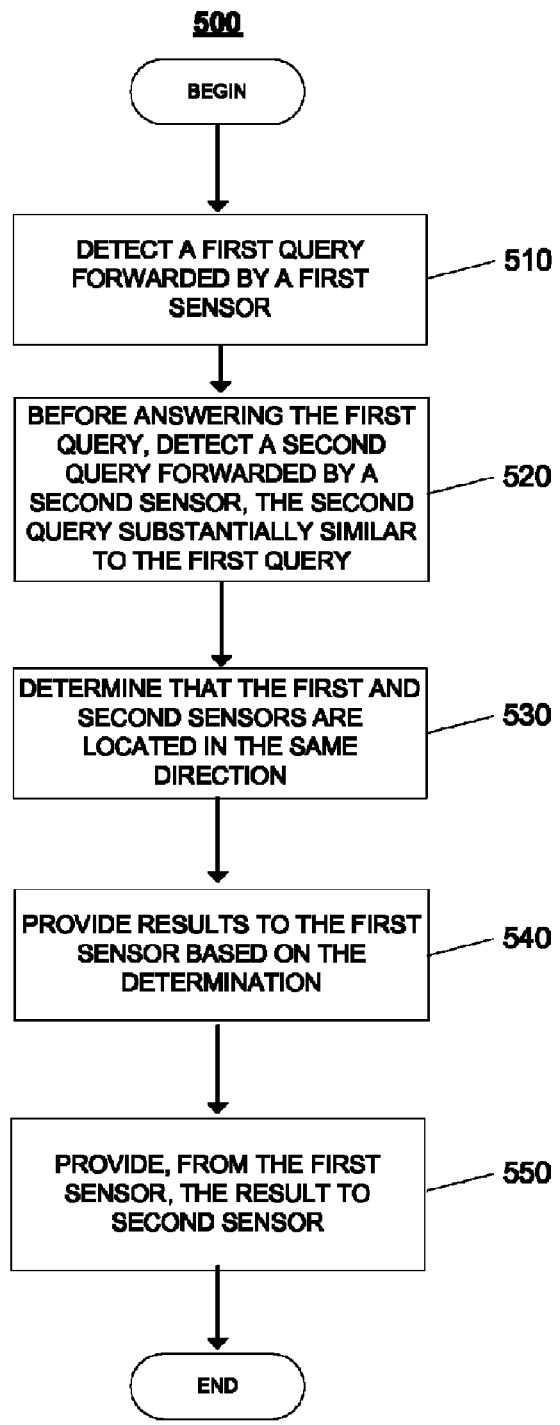
FIG. 5 is a flow diagram of an example process used to process a query detected by a sensor included in a sensor network.

FIG. 5 is a flow diagram of an example process used to process a query detected by a sensor included in a sensor network. More particularly, an example process 500 responds to queries made to a data-source sensor by more than one sensor querying device. More than one sensor querying device may request the same data (or similar data) simultaneously (or nearly simultaneously) from a data-source sensor or from a group of data-source sensors. Simultaneous queries may occur if the data-source sensor stores high-demand information. For example, a data-source sensor that stores up-to-date data related to the length of the line at a popular coffee shop located in a business district (such as the sensor 215 shown in FIG. 2) may receive many requests for such data on a weekday morning. In order to reduce the load on this data-source sensor and balance the traffic load among the sensor in the sensor network, the data-source sensor may forward results answering the query to one of the query issuers and request that the query issuer forward the results to the other query issuers. As described in more detail below, when the query issuers are located on the same side of the data-source sensor, forwarding the results to just one query issuer may result in a reduced load on the data-source sensor by relieving the data-source sensor of the burden of answering duplicate queries. Additionally, forwarding the results to just one query issuer may balance the load among the sensors in the sensor network.

A data-source sensor detects a first query forwarded by a first sensor (510). Before answering the first query, the data-source sensor detects a second query forwarded by a second sensor (520). The second query is substantially similar to the first query. The data-source sensor receives the first and second queries simultaneously, or nearly simultaneously. For example, the first and second queries may be received at the same time, or the first and second queries may be received within the time to process a query. In some implementations, the time to process the first and second queries may be, for example, one minute.

The data-source sensor determines that the first sensor and the second sensor are located in the same direction relative to the data-source sensor (530). The data-source sensor provides results to the first sensor based determining that the first and second sensors are located in the same direction relative to the data-source sensor (540). The results are provided from the first sensor to the second sensor (550).

Figure 6:
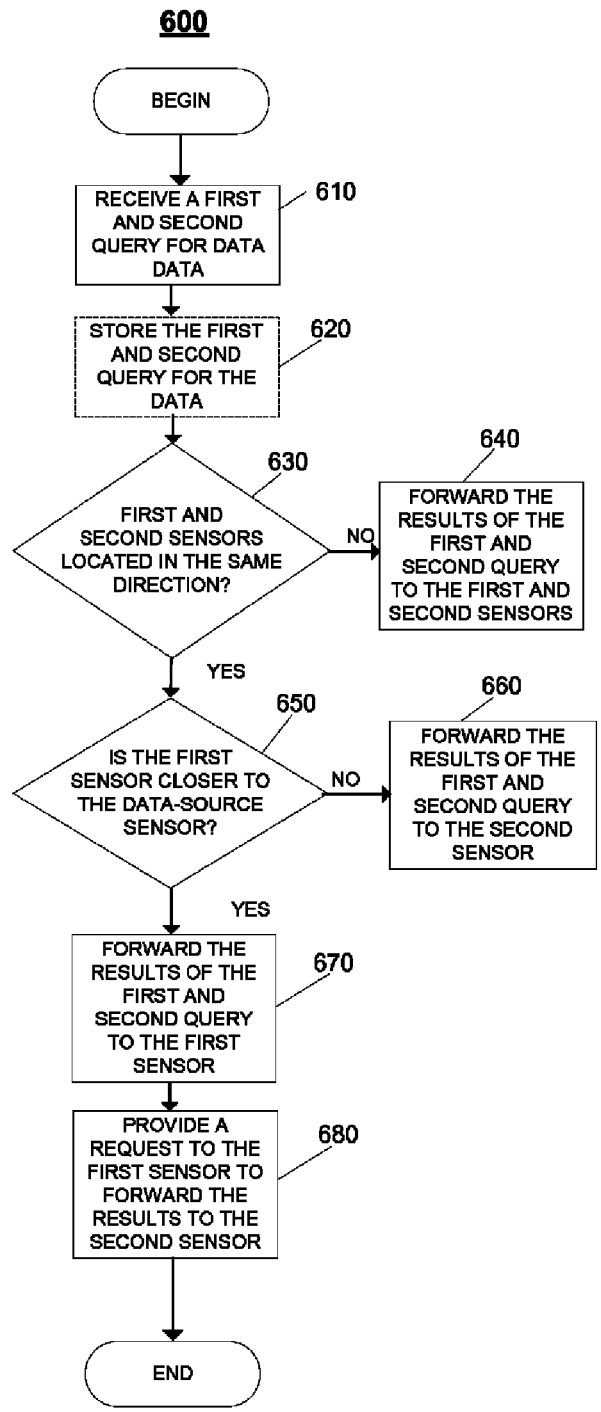
FIG. 6 is a flow diagram of an example process used to process a query detected by a sensor included in a sensor network.

FIG. 6 is a flow diagram of an example process used to process a query detected by a sensor included in a sensor network. More particularly, an example process 600 illustrates a load balancing scheme that may be used when a data-source sensor receives two or more simultaneous, or almost simultaneous, queries requesting the same or substantially similar data. As described above, simultaneous queries for the same data may be received by a data-source sensor that stores data of interest to many users. To avoid overloading the data-source sensor with the burden of continuously or frequently responding to the same query, the data-source sensor may respond to the query from one of the query issue sensors (e.g., one of the sensors that forwarded the query to the data-source sensor). Additionally, this query issue sensor may forward the results to the other query issue sensors. Thus, the data-source sensor responds to just one query even though the data-source sensor received multiple queries for the same information, which may reduce the load on the data-source sensor, balance the load among the sensors included in the sensor network, and/or result in a lower overall energy expenditure. However, lower overall energy expenditure may be best achieved if the query issue sensors are located in the same direction relative to the data-source sensor.

The process 600 begins when the data-source sensor receives a first query and a second query for data stored on the data-source sensor (610). The first query is forwarded from a first sensor and the second query is forwarded from a second sensor. The data-source sensor may store the first and second queries (620). Storing the first and second queries allows the data-source sensor to determine whether queries that are subsequently received are the same as the first and second queries.

The data-source sensor determines whether the first and second sensors are located in the same direction relative to the data-source sensor (630). In general, the first and second sensors are located in the same direction relative to the data-source sensor if the first and second sensors fall in one direction with respect to the data-source sensor. For example, and referring briefly to FIGS. 4A and 4B, the sensors 410E and 410F are located in the same direction relative to the sensor 410A. If the first and second sensors are not located in the same direction relative to the data-source sensor, the results answering the first and second queries are forwarded to the first sensor and the second sensor (640). If the first and second sensors are not located in the same direction relative to the data-source sensor, forwarding the results that answer the query to both the sensors may expend less overall energy than forwarding the results to one of the query issue sensors, which in turn forwards the results answering the query to the other query issue sensors. This scenario is discussed in greater detail with respect to FIGS. 8 and 7.

If the first and second query issue sensors are located in the same direction, the process 600 continues and the data-source sensor determines whether the first sensor is closer to the data-source sensor than the second sensor (650). The distance between two sensors may be approximated as the length of a line between the two sensors. The length of the line may be measured as, for example, hops (e.g., the number of sensors that a packet passes through as the packet travels from the query issue sensor to the data-source sensor) or as a geographical distance. To determine whether the first sensor is closer than the second sensor, the data-source sensor determines the distance from the data-source sensor to the first sensor and the distance between the first and second sensors. The first sensor is closer to the data-source sensor if the distance from the first sensor to the data-source sensor is less than twice the distance between the first and second sensors. If the first sensor is not closer to the data-source sensor, the results answering the first and second queries are sent to the second sensor (660). The data-source sensor provides a request to the second sensor to forward the results to the first sensor (670). If the first sensor is closer to the data-source sensor, the results answering the first and second queries are forwarded to the first sensor (680). The data-source sensor provides a request to the first sensor to forward the results answering the query to the second sensor (690).

Thus, using the example process 600, if the first and second sensors are on the same side of the data-source sensor, the data-source sensor provides one response answering the first and second queries. However, if the data-source sensor has a location between the first and second sensors (e.g., the first sensor and the second sensor are on opposite sides of the data-source sensor), sending the results answering the query to both the first and second sensors may consume less energy overall than sending the results to the closer of the first and second sensors and requesting that the recipient forward the results to the other sensor. If the first and second sensors are located on opposite sides of the data-source sensor, an overall energy savings may be achieved if the data-source sensor forwards the results answering the simultaneous queries to an intermediate sensor that forwards the results to the query issuers.

Figure 7:
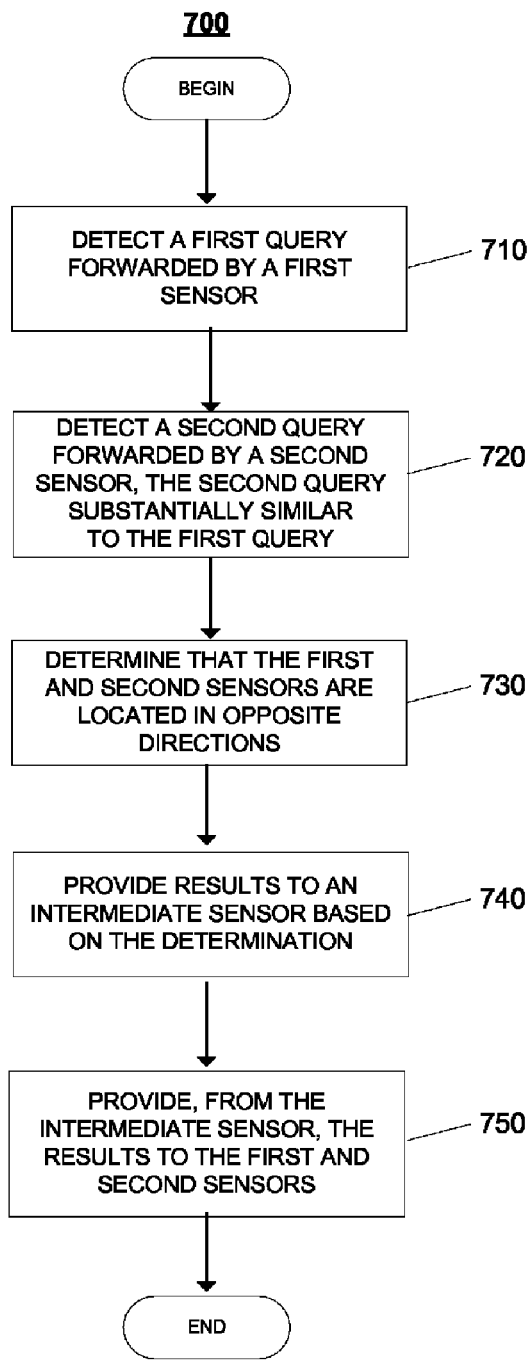
FIG. 7 is a flow diagram of an example process used to process a query detected by a sensor included in a sensor network.

FIG. 7 is a flow diagram of an example process used to process a query detected by a sensor included in a sensor network. More particularly, an example process 700 performs three-phase query processing in a network including sensors.

The sensor network may be a network such as sensor networks 120, 124, and 128 discussed with respect to FIG. 1. The process 700 begins when a data-source sensor detects a first query forwarded by a first sensor (710). Before answering the first query, a second query that is substantially similar to the first query is detected (720). The data-source sensor receives the first and second queries simultaneously, or nearly simultaneously. For example, the first and second queries may be received at the same time, or the first and second queries may be received within the time to process a query. In some implementations, the time to process the first and second queries may be one minute.

It is determined that the first and second sensors are located in opposite directions from the data-source sensor (730). For example, and as discussed in more detail with respect to FIG. 8, the first and second sensors are located in opposite directions with respect to the data-source sensor when the locations of the first sensor, the second sensor, and the data-source sensor form an equilateral triangle, or approximately form an equilateral triangle. Results answering the query are provided to an intermediate sensor based on the determination that the first and second sensors are on opposite sides of the data-source sensor (740). The results answering the query are provided from the intermediate sensor to the first and second sensors (750).

Figure 8:
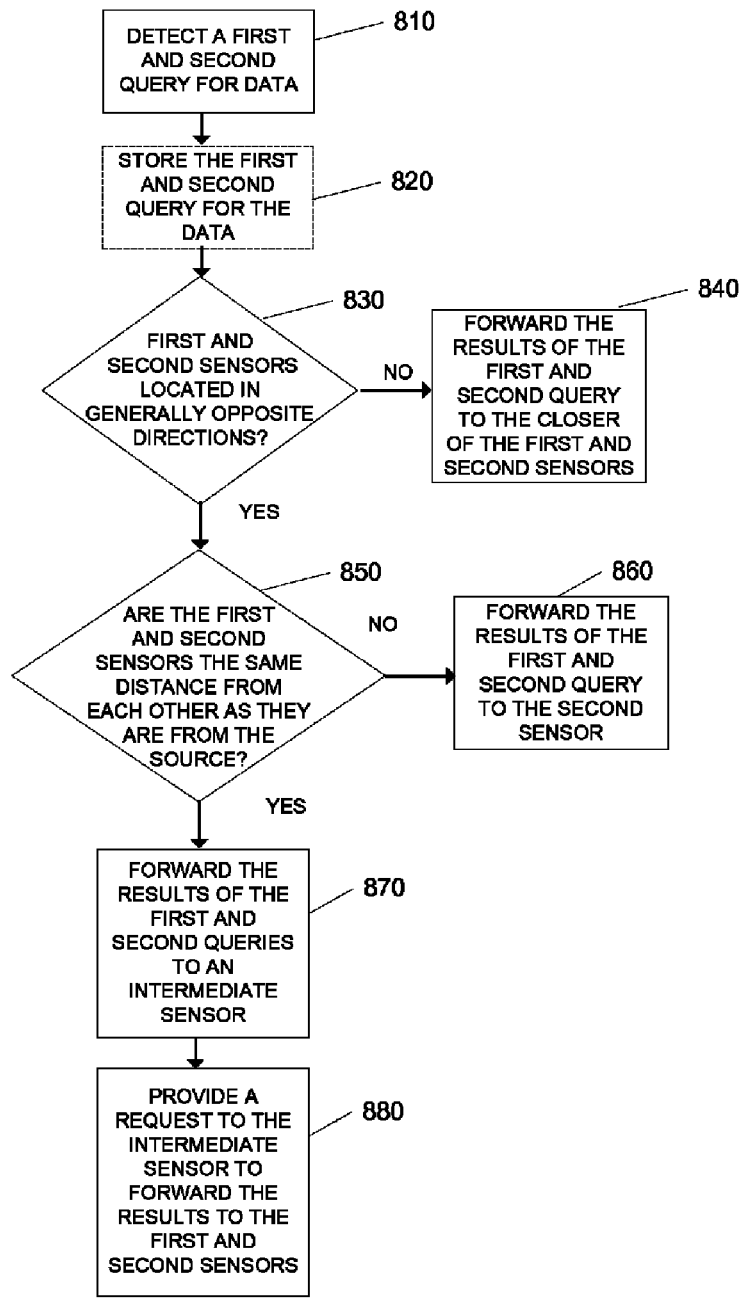
FIG. 8 is a flow diagram of an example process used to process a query detected by a sensor included in a sensor network.

FIG. 8 is a flow diagram of an example process used to process a query detected by a sensor included in a sensor network. More particularly, an example process 800 illustrates a load balancing technique that may be used when a data-source sensor receives two or more simultaneous (or almost simultaneous) queries requesting the same (or substantially similar) data. Simultaneous queries for the same data may be detected by a data-source sensor that stores data of interest to many users. To avoid overloading the data-source sensor with the burden of continuously responding (or frequently responding) to the same query, the data-source sensor may respond to the query once and rely on other sensors in the sensor network to forward the results answering the query. Thus, the data-source sensor responds to just one query even though the data-source sensor received multiple queries for the same information. This may reduce the load on the data-source sensor, balance the load among the sensors included in the sensor network, and/or result in a lower overall energy expenditure across the sensor network.

The process 800 begins when a first query and a second query for data are detected at a data-source sensor (810). The first and second queries are substantially similar to each other. For example, the first and second queries may request the same data, or portions of the first and second query may request the same data. If the first and second queries request the same data, the first and second queries intersect. Whether the first and second queries intersect is determined by the data-source sensor. The first and second queries are detected simultaneously, or nearly simultaneously. The first and second queries are detected simultaneously at the data-source sensor when the data-source sensor receives the first and second queries at the same time, or within the time the data-source sensor processes one query. The time to process one query may vary, but the time to process one query is generally one minute or less. For example, the time to process the first and second queries may be one minute. Due to latency in the sensor network, queries simultaneously detected by the data-source sensor are not necessarily issued by multiple query devices at the same time. However, generally, the detection of multiple, substantially similar (or identical) queries indicates that multiple sensor query devices are requesting the same data at approximately the same time. The data-source sensor may store the first and second query (820).

The data-source sensor determines whether the first and second sensors are located in generally opposite directions with respect to the data-source sensor (830). The first and second sensors may be located in generally opposite directions with respect to the data-source sensor if, for example, a line drawn through the data-source sensor bisects a line between the first sensor and the second sensor. For example, and referring briefly to FIG. 9, the sensors 910D and 910I are located in generally opposite directions with respect to the sensor 910F. If the first and second sensors are not located in generally opposite directions from the data-source sensor, the data-source sensor forwards results answering the first and second queries to the closer of the first and second sensor (840).

If the first and second sensors are located in generally opposite directions with respect to the data-source sensor, the data-source sensor determines whether the first and second sensors are the same distance from each other as the first and second sensors are from the data-source sensor (850). If the first and second sensors are not the same distance from each other as the first and second sensors are from the data-source, the results answering the query are forwarded to both the first sensor and the second sensor. In this scenario, forwarding the results to both the first and second sensors may consume less energy than forwarding the results to one sensor and having that sensor provide the response to the other sensors that issued the query.

However, if the first and second sensors are approximately the same distance from each other as the first and second sensors are from the data-source sensor (e.g., the locations of the first sensor, the second sensor, and the data-source sensor form an equilateral triangle), the results answering the query are forwarded to an intermediate sensor (870). This scenario is described in more detail with respect to FIG. 9. Briefly, the data-source sensor forwards the results answering the first and second queries to an intermediate sensor that has a location between the first and second sensors. By providing the results to an intermediate sensor that forwards the results to the first and second sensors, the data-source sensor only responds once to the multiple, simultaneous queries. This may help to reduce the load on the data-source sensor while also distributing the burden of responding to the query to other sensors in the sensor network.

The intermediate sensor may have a location between the first sensor and the second sensor if the intermediate sensor falls on or near a line drawn from the first sensor to the second sensor. In another example, the intermediate sensor may have a location between the first sensor and the second sensor if the first sensor, the second sensor, and the intermediate sensor are approximately equidistant from the data-source sensor and the distance from each of the first and second sensors to the data-source sensor is approximately equal. A request is provided to the intermediate sensor to forward the results answering the query to the first and second sensors (880).

Figure 9:
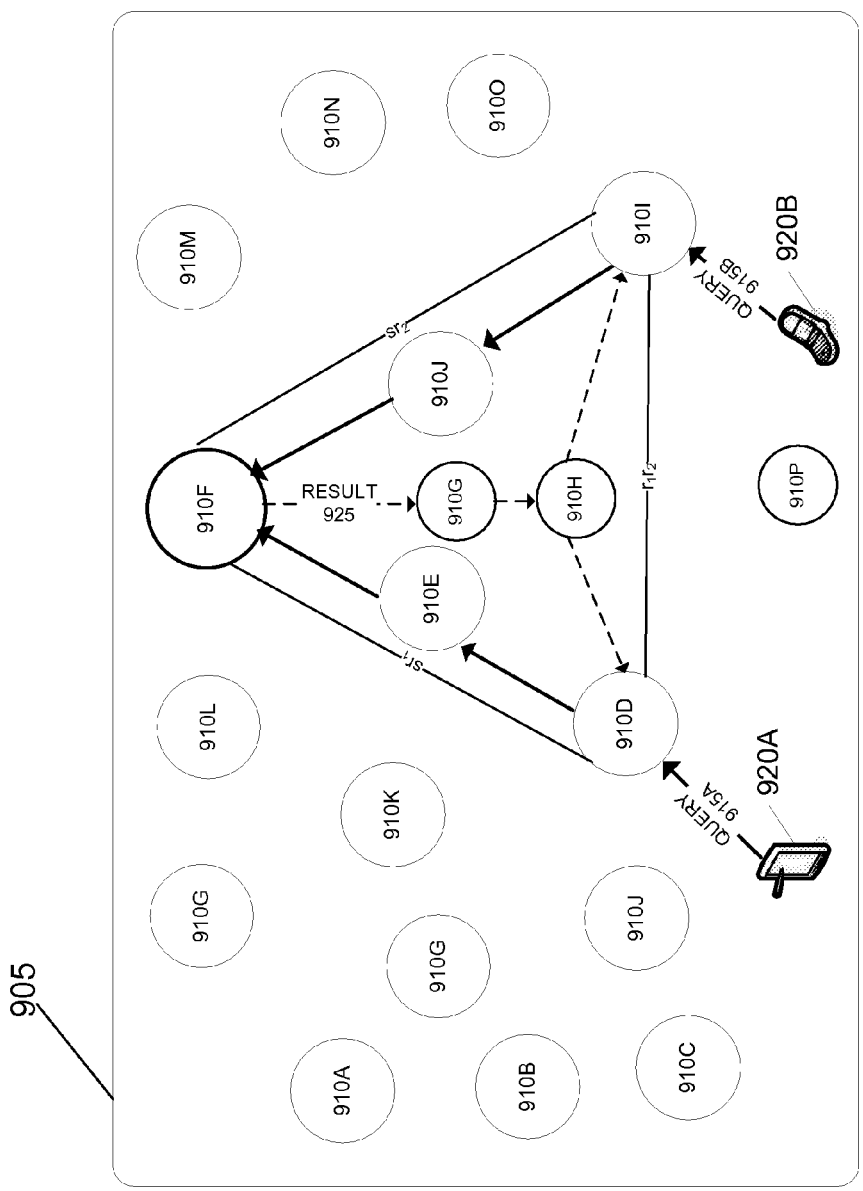
FIG. 9 is a block diagram of example sensor network.

FIG. 9 is a block diagram of an example sensor network. More particularly, an example sensor network 905 includes sensors 910A-910O illustrates the processing of queries 915A and 915B, which are issued from sensor query devices 920A and 920B. In the example shown, the queries 915A and 915B both address the sensor 910F. The query 915A is forwarded to the sensor 910F by the sensor 910D, and the query 915B is forwarded to the sensor 910F by the sensor 910I. Thus, in this illustration, the sensor 910F may be referred to as the data-source sensor and the sensors 910D and 910I may be referred to as query issuers. In other examples, the sensor query devices 920A and 920B may be the query issuers. In this illustration, the queries 915A and 915B request the same data from the sensor 910F, and the sensor 910F receives the queries 915A and 915B simultaneously, or nearly simultaneously. Additionally, the sensors 910D and 910I are located in generally opposite directions with respect to the sensor 910F.

More particularly, the sensor query devices 920A and 920B issue queries 915A and 915B, respectively, requesting the same data. For example, the queries 915A and 915B may be issued at lunchtime and request data related to the length of the line at a popular sandwich shop located near the sensor 910F. The sensor query device 920A issues the query 915A, which is detected by the sensor 910D. The query 915B is issued by the sensor query device 915B, and the query 915B is detected and received by the sensor 910I. The queries 915A and 915B both address the sensor 910F. The sensors 910D and 910I forward the queries 915A and 915B, respectively, toward the sensor 910F. The sensor network 905 may use a multi-hop routing protocol to forward the queries 915A and 915B to the sensor 910F. In the example shown in FIG. 9, the query 920A passes through the sensor 910E as the query 920A is routed to the sensor 910F. Similarly, the query 920B passes through the sensor 910J as the query 920B is routed to the sensor 910F. In other examples, the queries 920A and 920B may pass through additional sensors prior to reaching the data-source sensor (e.g., the path through the network that the query follows from the query issuer to the data-source sensor may include more "hops").

Once the sensor 910F detects the simultaneous, or nearly simultaneous, queries 915A and 915B, the sensor 910F determines whether the queries 915A and 915B, or a portion of the queries 915A and 915B, intersect. As discussed above, queries that request the same data intersect. In this example, the queries 915A and 915B both request information related to the length of a line of customers at a popular sandwich shop located near the sensor 910F, thus the queries 915A and 915B intersect. Accordingly, the same data is responsive to both queries. The sensor 910F determines the relative locations of the sensors 910D and 910I. In this example, the locations of the sensors 910D and 910I are in opposite directions with respect to the sensor 910F. Additionally, the sensor 910F determines whether the distance from the sensor 910F to the sensor 910D (which is shown as the length "$sr_1$" in FIG. 9) is approximately the same as the distance from the sensor 910F to the sensor 910I (which is shown as the length "$r_1r_2$" in FIG. 9). The sensor 910F makes a similar determination with respect to the distance from the sensor 910F to the sensor 910I (which is shown as the length "$sr_2$" in FIG. 9). The distance may be measured as a number of hops between the sensors, as a geographical distance, or as a logical distance. If the determined distances are the same, or approximately the same, the data-source sensor (sensor 910F in this example) and the query issue sensors (sensors 910D and 910I in this example) fall on an equilateral triangle. In this case, forwarding the results answering the queries to an intermediate sensor located between the query issue sensors may reduce the load on the data-source sensor (because the data-source sensor responds to only one of the multiple queries the data-source detects) and distribute, or balance, the load across the sensor network.

In the example shown, the relative locations of the sensors 910D, 910F, and 910I in the sensor network form the shape of an equilateral triangle, thus the sensor 910F forwards results 925 answering the queries 915A and 915B to an intermediate sensor 910H located between the query issuing sensors 910D and 910I. The results 925 include one or more packets that make up the query results. The intermediate sensor forwards the results 925 to the sensors 910D and 910I. The intermediate sensor is determined on a hop-by-hop basis as the results 925 are routed from the sensor 910F. In one implementation, the sensor 910F determines the intermediate sensor by forwarding the results 925 toward the physical (or logical) bisector of the line $r_1r_2$. As the results travel toward the bisector, the results are detected and received by the sensor 910G. The sensor 910G checks whether continuing to forward the results 925 toward the bisector of the line $r_1r_2$ would bring the results 925 closer to the sensors 910D and 910I. In the example shown, continuing to forward the results 925 would bring the results 925 closer to the bisector. Thus, the sensor 910G forwards the results 925 toward the bisector. The results 925 are detected at the sensor 910H, which makes a similar determination as the sensor 910G. However, 910H determines that forwarding the results further toward the bisector would not bring the results 925 closer to the sensors 910D and 910I. Thus, the sensor 910H is the intermediate sensor. The sensor 910H forwards a copy of the results 925 to the sensors 910D and 910I. Thus, the data-source sensor 910F responds to one of the multiple queries the data-source sensor 910F receives and relies on the intermediate sensor 910H to copy and forward the results 925 answering the queries 915A and 915B.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results could still be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method comprising:
   providing a network of sensors including a first sensor, a second sensor, and a data-source sensor, wherein each sensor is configured to transmit status information and operating data over the network to the data-source sensor as well as receive and respond to messages including queries from devices and commands from the data-source sensor;
   receiving at the data-source sensor a first query at a first time from the first sensor;
   processing the first query including storing the query and providing results answering the first query to the first sensor;
   tracking with the data source sensor, that the data-source sensor provided the results to the first sensor including storing recent queries received from sensors in the sensor network, responses provided to the recent queries, and identifiers of the sensors to which the queries were provided;
   receiving a second query at a second later time from the second sensor wherein the first and second queries are addressed to the data-source sensor and wherein the first query is forwarded by the first sensor to the data-source sensor and the second query is forwarded by the second sensor to the data-source sensor;
   comparing the first query and the second query;
   based on the comparing, detecting at the data-source sensor that the first query is substantially similar to the second query; and
   when the first and second query are substantially similar, transmitting a message from the data source sensor to the first sensor instructing the first sensor to provide the results to the second sensor.

2. The method of claim 1, wherein the first query is substantially similar to the second query in the event that the first query and the second query request the same data from the data-source sensor.

3. The method of claim 1, wherein at least one of the first query and the second query requests data of a particular type stored on one or more sensors included in the sensor network.

4. The method of claim 1, wherein at least one of the first query and the second requests data related to a particular geographic area.

5. The method of claim 4, wherein the data related to a particular geographic area comprises at least one indication of an available capacity of the geographic area.

6. The method of claim 1, wherein:
   the first query and the second query include more than one portion, and
   the first query is substantially similar to the second query when the first query and the second query have at least one matching portion.

7. The method of claim 1 further comprising:
   determining, by the data-source, that a predetermined number of queries were received in a predetermined time; and
   sending an indicator to the first sensor to provide the results to the second sensor, and
   wherein the results are provided to the second sensor based on the indicator.

8. The method of claim 1, wherein:
   the network of sensors further includes devices configured to query the sensors included in the sensor network, and the devices include at least one mobile device.

9. The method of claim 1, wherein:
   the first query is forwarded using an underlying routing protocol of the sensor network, and
   the results answering the query are provided to the first and second sensor using the underlying routing protocol of the sensor network.

10. The method of claim 9, wherein the underlying routing protocol is a point-to-point protocol.

11. The method of claim 1, wherein the first query and the second query are received at the data-source sensor within a predetermined amount of time relative to one another.

12. A system comprising:
    a data-source sensor configured to:
       receive a first query at a first time from a first sensor;
       process the first query including storing the query;
       receive a second query at a second later time from a second sensor; wherein the first and second queries are addressed to the data-source sensor and wherein the first query is forwarded by the first sensor to the data-source sensor and the second query is forwarded by the second sensor to the data-source sensor, and wherein each of the first and second sensor is configured to transmit status information and operating data over a sensor network to the data-source sensor as well as receive and respond to messages including queries from devices and commands from the data-source sensor;
       compare the first query and the second query;
       detect that the first query is substantially similar to the second query;
       provide, based on a determination that the first sensor and the second sensor are located in generally opposite directions relative to the data-source sensor, results answering the first query to an intermediate sensor that generally lies between a location of the first sensor and a location of the second sensor;
       track that the data-source sensor provided the results to the intermediate sensor including storing recent queries received from sensors in the sensor network, responses provided to the recent queries, and identifiers of the sensors to which the queries were provided; and
       transmit a message to the intermediate sensor instructing the intermediate sensor to provide the results both to the first sensor and the second sensor.

13. The system of claim 12, wherein the data-source sensor is further configured to:
    determine a location of each of the first sensor, the second sensor, and the data-source sensor;
    determine whether the locations of the first sensor, the second sensor, and the data-source sensor form an equilateral triangle;
    send, if the locations form an equilateral triangle, the results answering the query to an intermediate sensor having a location between the first sensor and the second sensor; and
    forward the results answering the query from the intermediate sensor to the first and second sensors.

14. The system of claim 12, wherein the first sensor and the second sensor are located in opposite directions relative to the data-source sensor if a distance from the data-source sensor to the first sensor is less than a distance from the data-source sensor to the second sensor.

15. The system of claim 14, wherein distance is based on a number of sensors a packet passes through when forwarded from the data-source sensor to the first or second sensor.

16. The system of claim 14, wherein distance is based on a geographic distance.

17. The system of claim 12, wherein the intermediate sensor generally lies between a location of the first sensor and a location of the second sensor in the event that:
the first sensor, the intermediate sensor, and the second sensor fall on a straight line, and
a distance from the intermediate sensor to either of the first or second sensors is not more than a distance from the first sensor to the second sensor.

18. A method comprising:
receiving at a data-source sensor a first query from a first sensor;
processing the first query including storing the query;
receiving a second query from a second sensor at a second later time from a second sensor;
wherein the first and second queries are addressed to the data-source sensor and wherein the first query is forwarded by the first sensor to the data-source sensor and the second query is forwarded by the second sensor to the data-source sensor, and wherein each of the first and second sensor is configured to transmit status information and operating data over a sensor network to the data-source sensor as well as receive and respond to messages including queries from devices and commands from the data-source sensor;
comparing the first query and the second query;
detecting at the data source sensor that the first query is substantially similar to the second query, wherein:
the second query is received before determining results answering the first query;
based on a determination that the first sensor and the second sensor are located in a same direction relative to the data-source sensor, the data-source sensor provides, to the first sensor, the results answering the first query;
tracking with the data source sensor that the data-source sensor provided the results to the first sensor including storing recent queries received from sensors in the sensor network, responses provided to the recent queries, and identifiers of the sensors to which the queries were provided; and
transmitting a message from the data source sensor to the first sensor instructing the first sensor to provide the results to the second sensor.

19. The method of claim 18, wherein the data-source sensor provides, to the first sensor, results answering the first query and a request to provide the results to the second sensor.

20. The method of claim 19, wherein the first sensor and the second sensor are located in same direction relative to the data-source sensor in the event that a distance from one of the first and second sensors to the data-source sensor is less than a distance from the other of the first and second sensors to the data-source sensor.

21. The method of claim 18, wherein the first query is substantially similar to the second query when the first query and the second query request the same data from the data-source sensor.

22. The method of claim 18, wherein at least one of the first query and the second query requests data related to a particular geographic area.

23. The method of claim 18, wherein:
the first query and the second query include more than one portion, and
the first query is substantially similar to the second query when the first query and the second query have at least one identical portion.

24. The method of claim 18, wherein:
the network of sensors further includes multiple devices configured to query the sensors included in the sensor network, and
the multiple devices include at least one mobile device.

25. The method of claim 18, wherein:
the first query is forwarded using an underlying routing protocol of the sensor network, and
the results answering the query are provided to the first and second sensor using the underlying routing protocol of the sensor network.

26. The method of claim 18, wherein the underlying routing protocol is a point-to-point protocol.

27. A non-transitory computer-readable storage medium having embodied thereon a computer program including instructions that, when executed perform operations comprising:
comparing a first query received by a data-source sensor from a first sensor to a second query received later by the data source sensor from a second sensor, wherein each of the first and second sensor is configured to transmit status information and operating data over a sensor network to the data-source sensor as well as receive and respond to messages including queries from devices and commands from the data-source sensor;
detecting that the first query is substantially similar to the second query, wherein:
the first and second queries are addressed to the data-source sensor;
the first query is forwarded by the first sensor to the data-source sensor and the second query is forwarded by the second sensor to the data-source sensor,
tracking that the data-source sensor provided the results to the first sensor including storing recent queries received from sensors in the sensor network, responses provided to the recent queries, and identifiers of the sensors to which the queries were provided; and
transmitting a message from the data source sensor to the first sensor instructing the first sensor to provide results answering the first query to the second sensor.

28. A non-transitory computer-readable storage medium having embodied thereon a computer program including instructions that, when executed perform operations comprising:
comparing a first query received by a data source sensor from a first sensor to a second query received later by the data source sensor from a second sensor, wherein each of the first and second sensor is configured to transmit status information and operating data over a sensor network to the data-source sensor as well as receive and respond to messages including queries from devices and commands from the data-source sensor;
detecting that the first query is substantially similar to the second query, wherein:
the first query and the second query are addressed to the data-source sensor,
the first query is forwarded by the first sensor to the data-source sensor and the second query is forwarded by the second sensor to the data-source sensor, and
the second query is received before determining results answering the first query; and
based on a determination that the first sensor and the second sensor are located in a same direction relative to the data-source sensor, the data-source sensor provides, to the first sensor, the results answering the first query;

tracking that the data-source sensor provided the results to the first sensor including storing recent queries received from sensors in the sensor network, responses provided to the recent queries, and identifiers of the sensors to which the queries were provided; and transmitting a message from the data source sensor to the first sensor instructing the first sensor to provide the results to the second sensor.

* * * * *

UNITED STATES PATENT AND TRADEMARK OFFICE
CERTIFICATE OF CORRECTION

PATENT NO. : 8,392,401 B1
APPLICATION NO. : 11/875571
DATED : March 5, 2013
INVENTOR(S) : Mohamed Aly and Adel A. Youssef Page 1 of 1

It is certified that error appears in the above-identified patent and that said Letters Patent is hereby corrected as shown below:

In the Claims

Column 17, line 45, in claim 4, after "second", please insert --query--.

Signed and Sealed this
Thirtieth Day of July, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,392,401 B1 |
| APPLICATION NO. | : 11/875571 |
| DATED | : March 5, 2013 |
| INVENTOR(S) | : Aly et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 455 days.

Signed and Sealed this
Twenty-fifth Day of November, 2014

Michelle K. Lee
*Deputy Director of the United States Patent and Trademark Office*